United States Patent Office 3,510,540
Patented May 5, 1970

3,510,540
RESINOUS COATING COMPOSITIONS CONTAINING AMIDE INTERPOLYMERS
Erwin J. Kapalko and Richard A. Martin, Delaware, Ohio, assignors to PPG Industries, Inc., a corporation of Pennsylvania
No Drawing. Filed Sept. 21, 1967, Ser. No. 669,410
Int. Cl. C08g 45/08, 45/10
U.S. Cl. 260—831
16 Claims

ABSTRACT OF THE DISCLOSURE

Coating compositions having outstanding detergent resistance and other properties are provided by a combination of an interpolymer of an unsaturated carboxylic acid amide and one or more other ethylenic monomers, and an aromatic reaction product of an alkyl-substituted aromatic hydrocarbon-aldehyde condensate with a polyepoxide or a methylol phenol ether composition of the formula

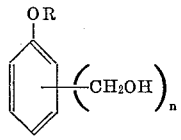

where $n$ is 1 to 3 and R is an unsaturated aliphatic group or a halogenated derivative of such a group. The amide interpolymer is modified by reaction of the amide groups with an aldehyde and preferably these groups are further reacted with an alcohol. The properties of these coating compositions make them highly useful on appliances such as laundry equipment.

Various compositions comprising interpolymers of unsaturated carboxylic acid amides, and especially aldehyde-modified and etherified interpolymers of such amides with other ethylenically unsaturated monomers, have been utilized extensively in coatings. A number of such interpolymers which have found wide acceptance in the coatings field are disclosed for example, in U.S. Pats. Nos. 2,978,437 and 3,037,963. These interpolymers are employed alone or, more usually, in combination with other resins, and are utilized as clear films or as resinous vehicles for primers, enamels and other thermosetting compositions. When so used, such compositions provide highly desirable coatings having excellent properties, including, for instance, good adhesion, chemical resistance, mar resistance, etc.

However, although compositions comprising these interpolymers provide coatings having outstanding overall properties which make them highly desirable for many applications, for some uses they have certain disadvantages. For example, when formulated as to provide optimum properties of certain types, they tend to be differmum properties of certain types, they tend to be deficient in other properties. One especially troublesome property is detergent resistance, which means the ability to withstand hot solutions of detergents without degradation of the coating or the substrate. Detergent resistance is an extremely important property in any coating for use on laundry equipment or other appliances.

It has now been found that coating compositions having a particularly good combination of properties, including unexpectedly outstanding detergent resistance, are obtained by combining (1) the aforesaid amide interpolymers with (2) an aromatic reaction product of an alkyl-substituted aromatic hydrocarbon-aldehyde condensate and a member of the group consisting of (a) polyepoxides and (b) a composition consisting essentially of one or more methylol phenol ethers. Such coating compositions provide numerous advantages, including as mentioned, exceptional detergent resistance, as well as improved adhesion to many substrates such as aluminum, better salt-spray resistance, resistance to yellowing upon baking, and improved impact resistance and flexibility, and provide these advantages without detracting from other properties. The excellent properties of the coating compositions herein make them especially useful as coatings for laundry equipment and similar appliances in which the high degree of detergent resistance they provide is particularly desirable.

The amide polymer component of the compositions of this invention can be any aldehyde-modified interpolymer of an unsaturated carboxylic acid amide; the aldehyde-modified interpolymer is preferably at least partially etherified. The aldehyde-modified amide interpolymer is obtained by polymerizing an unsaturated amide and at least one ethylenically unsaturated monomer and reacting the amide groups of the interpolymer thus formed with an aldehyde. Etherification is carried out by further reaction of the aldehyde-modified amide groups with an alcohol. Alternatively, aldehyde-modified interpolymers are produced by interpolymerizing an aldehyde-modified amide, such as an alkylol amide, which may be then etherified, or by employing an N-alkoxyalkyl amide.

In either case, the aldehyde-modified etherified amide polymer contains amido groups having a hydrogen atom replaced by the structure:

where R is hydrogen or an alkyl radical and $R_1$ is hydrogen or an organic radical.

Methods for producing N-alkoxyalkyl-substituted unsaturated carboxylic acid amides, such as N-butoxymethyl acrylamide are disclosed in United States Patents Nos. 3,079,434 and 3,087,965. When these and similarly substituted unsaturated carboxylic acid amides are polymerized, the resulting reaction product contains the aforesaid structure without any further treatment.

If, however, the unsaturated carboxylic acid amide does not contain such a structure, i.e. an unsubstituted amide is employed, the resulting amide polymer should be reacted with an aldehyde whereby such structure in which $R_1$ is hydrogen is produced by reaction of the aldehyde with an amido hydrogen atom to produce a hydroxyorgano group. When the aldehyde modified product is also reacted with an alcohol, etherification of the hydroxyorgano groups by the alcohol takes place.

It is desirable to etherify at least part, and in many cases at least about half, of the hydroxyorgano groups of those amide interpolymers produced from unsubstituted or alkylol amides. Otherwise, problems of storage stability or premature gelation and flexibility of the coating may be encountered.

After etherification, the amide polymer contains amido groups having a hydrogen atom replaced by the structure:

where R is hydrogen when the aldehyde employed is formaldehyde and an alkyl radical when other aliphatic aldehydes are used. $R_1$ represents the radical derived by removing a hydroxyl group from the etherifying alcohol, i.e., an organic radical, or in those groups not etherified represents hydrogen. $R_1$ in the etherified groups can be, for example, alkyl or aryl. The terms "alkyl" and "aryl" as employed herein are to be construed broadly; the groups represented by $R_1$ may include other substituents and functional groups which do not affect the properties of the product. Thus, $R_1$ may include unsaturated linkages, ether linkages, halogens and other substituents, or it may be cyclic.

Satisfactory products may in some instances be obtained with only a very small part of the hydroxyorgano groups having been etherified, in some instances 5 percent or less, but as mentioned, it is usually desirable that at least about 50 percent of the hydroxyorgano groups be etherified. Butanol is a preferred alcohol for use in the etherification, although any monohydric alcohol, such as methanol, ethanol, propanol, pentanol, octanol, decanol, and other alkanols containing up to about 20 or more carbon atoms, may also be employed, as may aromatic alcohols, such as benzyl alcohol; or cyclic alcohols, such as cyclohexanol; or the monoethers of glycols, such as butyl Cellosolve (ethylene glycol monobutyl ether), and other Cellosolves and Carbitols; or substituted alcohols, such as 3-chloropropanol.

While either acrylamide or methacrylamide is preferred for use in forming the interpolymer component, any polymerizable unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid and esters thereof, and imide derivatives such as N-carbamyl maleimide, may also be utilized. Preferably, the interpolymer should contain from about 2 to about 50 percent by weight of the amide, the balance being the other ethylenic monomer or monomers.

At least one other unsaturated monomer is interpolymerized with the unsaturated carboxylic acid amide; any polymerizable ethylenically unsaturated monomer can be so utilized. Such monomers include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. The interpolymer compositions described in United States Patents Nos. 2,978,437 and 3,307,963 are excellent examples of the preferred type of amide polymers utilized in the instant invention, and the many unsaturated compounds disclosed therein illustrate the numerous monomers which can be interpolymerized along with the amide. The polymerization reaction to form the amide interpolymer is also described in the aforesaid patents, and is ordinarily carried out using a free-radical initiator, such as peroxygen type catalyst, and a mercaptan or other chain-stopping agent.

When necessary to produce the desired structures, the amide groups are reacted with an aldehyde, preferably in the presence of an alcohol and a mild acid catalyst, such as maleic anhydride. Formaldehyde or a formaldehyde-yielding substance is greatly preferred, but other aldehydes, such as acetaldehyde, butyraldehyde, and the like, can be used. It is ordinarily preferred to utilize about 2 equivalents of aldehyde for each amide group present in the interpolymer, although the ratio may be as high as 3.0 equivalents or as low as about 0.2 equivalent of aldehyde for each amide group.

In producing the compositions of the invention, the above interpolymers are combined with an aromatic reaction product of an alkyl-substituted aromatic hydrocarbon-aldehyde condensate and either a polyepoxide or a methylol phenol ether composition or both.

The aromatic hydrocarbon-aldehyde condensates employed in making these reaction products are produced from various alkyl-substituted aromatic hydrocarbons including toluene, ortho-, meta- and para-xylenes, ethylbenzene, alkylated naphthalenes, alkylated anthracene, etc. Xylene is the preferred aromatic hydrocarbon and is generally employed as the commercial mixture which contains the various isomers in combination. Formaldehyde is the preferred aldehyde used in making the condensate, but other aldehydes which can be employed include acetaldehyde, propionaldehyde, butyraldehyde, benzaldehyde, furfural, and the like.

The polyepoxides which can be used to react with the above condensate to provide the reaction products utilized in the invention include any epoxide compound or mixture which has a 1,2-epoxy equivalence of greater than 1.0. Such polyepoxides comprise a relatively large class of materials and have been described in numerous patents. Some of these patents are United States Patents Nos. 2,467,171; 2,615,007; 2,716,123; 3,030,336; 3,053,855 and 3,075,999.

The preferred polyepoxides employed in these reaction products are the polyglycidyl ethers of polyhydric compounds. These are prepared, for example, by reaction of the polyhydric compound with epichlorohydrin or dichlorohydrin in the presence of an alkali. One class of preferred polyhydric compounds are the polyphenols, and particularly Bisphenol A. Other phenolic compounds that can be utilized include 4,4'-dihydroxy-benzophenone, bis (4-hydroxyphenyl)-1,1-ethane, bis(4-hydroxyphenol)-1,1- (4-hydroxyphenyl)-1,1-ethane, bis(4-hydroxyphenol)-1,1-isobutane, bis (4-hydroxy-tertiary-butylphenyl)-2,2-propane, bis(2-hydroxy-naphthyl)methane or the like. The polyphenol can also be a novolak resin or a similar polyphenol resin. Other polyhydric compounds that can be utilized include those derived from polyhydric alcohols such as ethylene glycol, diethylene glycol, triethylene glycol, 1,2-propylene glycol, 1,4-butylene glycol, 2,4,6-hexanetriol, glycerol and the like.

In addition to the foregoing polyglycidyl ethers of polyhydric compounds, other polyepoxides that can be employed include polyglycidyl esters of polycarboxylic acids, which can be produced by the reaction of epichlorohydrin or similar epoxy compounds with an aliphatic or aromatic polycarboxylic acid such as oxalic acid, succinic acid, adipic acid, phthalic acid, dimerized linolenic acid and the like. Diglycidyl adipate and diglycidyl phthalate are examples.

Still other useful polyepoxides are derived from the epoxidation of an olefinically unsaturated alicyclic compound. These can be diepoxides and higher epoxides as well as mixtures of epoxides. They can be obtained, for example, by epoxidation of alicyclic olefins with oxygen and selected metal catalysts, or by reaction with acetaldehyde monoperacetate, or by epoxidation using peracetic acid. Examples of such polyepoxides are described in U.S. Patents Nos. 2,716,123; 2,786,066 and 2,786,067.

Alternatively or in combination with the polyepoxide, suitable aromatic reaction products are produced by reacting the condensate with a methylol phenol ether composition consisting essentially of one or more methylol phenol ethers of the formula

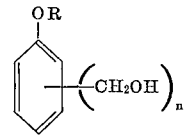

where $n$ is an integer from 1 to 3 and R is an unsaturated aliphatic group or a halogen-substituted unsaturated aliphatic group. The groups represented by R should contain at least 3 carbon atoms and can be, for example, allyl groups (which are preferred) or others such as methallyl, crotyl, butenyl, or the like. The halogen-substituted unsaturated groups represented by R can be various mono- and poly-halogenated derivatives of the above unsaturated aliphatic groups, for example, 2-chloro-allyl, 3-chloroallyl, 3-chloro-2-methylallyl, 1-chloro-2-butenyl, and corresponding groups containing halogens such as bromine or fluorine.

The methylol phenol ether compositions employed herein are described in U.S. Patent 2,597,330, and as disclosed therein can be produced from sodium or barium salts of 2,4,6-tris(hydroxymethyl)phenols which are obtained by reacting formaldehyde with phenol in the presence of sodium or barium hydroxide. Several methylol phenol ether compositions of this type are commercially available and these generally comprise mixtures of allyl ethers of mono-, di- and trimethylol phenols (substituted in the ortho, para and meta positions). The trimethylolated derivative is generally the predominant component of the composition. Such commercially available methylol phenol ether compositions are preferred for use in the invention.

The proportions of aromatic hydrocarbon-aldehyde condensate and polyepoxide and/or methylol phenol ether composition used to prepare the aromatic reaction products can be varied but ordinarily the aromatic hydrocarbon-aldehyde resin forms from about 30 to about 70 percent by weight of the total weight of the aromatic reaction product. Reaction products made from approximately equal weights of the reactants are generally preferred.

The aromatic reaction products are ordinarily produced by combining the components, usually in the presence of an acid catalyst and generally at elevated temperatures, e.g. from about 100° C. to about 180° C. In some cases, and particularly using methylol phenol ether compositions, heating is not always necessary.

The aromatic reaction products employed herein are largely described in U.S. Pat. No. 2,825,712. Several such reaction products are available commercially, these being in most cases either a reaction product of xylene-formaldehyde resin with an epichlorohydrin-Bisphenol A polyepoxide or a reaction product of xylene-formaldehyde resin with a mixture of allyl ethers of mono-, di-, and trimethylol phenols. Such commercially available aromatic reaction products are preferred for use in the present invention.

The proportions of the aromatic reaction product and the amide interpolymer in the coating composition can be varied considerably. The optimum amount employed depends upon the particular properties desired in the product and also depends in part upon the particular amide interpolymer employed, i.e. the type of monomers in the interpolymer in addition to the amide. In most instances, compatibility of the components must be considered although for some purposes some degree of incompatibility can be tolerated. In the preferred products, the aromatic reaction product comprises from about 3 to about 25 percent of the total weight of aromatic reaction product and amide interpolymer, although as little as 1 percent gives some degree of improvement in the properties of the amide interpolymer coating composition and as much as 50 percent or even higher can be utilized in some cases.

In the ordinary case, the amide interpolymer is first produced and then combined with the aromatic reaction product. Heating of the mixture can be carried out although it is not usually necessary. When mixed in this manner it is not known with certainty whether any co-reaction takes place between these components, but some reaction may take place either prior to or during curing. It is also possible to add the aromatic reaction product during the polymerization of the amide interpolymer components, and thereby provide additional opportunity for some degree of interreaction. Also, if desired the monomers employed in the amide interpolymer can include monomers containing reactive sites which can more easily react with the aromatic reaction product.

In addition to the amide interpolymer and the aromatic reaction product, the coating compositions herein ordinarily contain several additive components to provide the desired overall combination of properties. Such additive materials are those ordinarily utilized with the amide interpolymers of the class herein and these can include, for instance, epoxy resins, amine resins, and other resinous materials, as well as various plasticizers and materials to decrease the required curing temperatures, such as acids or adducts of maleic anhydride with hydroxyl-containing polymers.

Various pigments are also usually included to provide colored finishes as desired.

The coating compositions described herein are particularly useful to provide thermosetting coatings for appliances such as laundry equipment, where detergent resistance is an important property. These coating compositions are useful as primers and also as topcoats or as one coat finishes. They have excellent resistance to yellowing during baking and therefore are admirably suited for topcoats where a white finish is desired. In addition, they have other properties desirable in such coatings such as outstanding adhesion, flexibility, impact resistance, and chemical resistance. They can also be used as a primer if desired with virtually any topcoat material. Because of their resistance to yellowing, they can be used as a "flash" primer, i.e. applied and topcoated without prior baking of the primer.

The coating compositions herein can be applied by any conventional application method, such as by electrostatic or conventional spraying, roll coating, brushing and the like. Ordinarily, the composition will include one or more solvents, and the choice of solvents and the concentration of the resinous components in the solvent mixture are chosen with reference to the desired manner in which the composition is to be applied. The compositions can be applied to various substrates; while they are most usually employed as coatings on metals such as steel, aluminum, treated steels, copper, etc., they can also be utilized over wood, glass, plastics, and other substrates.

After application, the compositions are dried and cured by baking at elevated temperatures to produce a cured, hard, infusible film. The baking schedules employed also depend upon the nature of the particular composition, the nature of the substrate, and the manner in which it is to be used. The inclusion of an acid monomer in the amide polymer, or addition of various agents can lower the effective curing temperature. Generally speaking, baking temperatures of at least 200° F. and preferably 300° F. are employed, and the ordinary baking schedule is between 325° F. and 425° F. for 10 to 40 minutes. In some cases, other curing techniques, not requiring such elevated temperatures, can be used.

Set forth below are several examples giving the compositions of several amide interpolymers that can be employed in the invention. These amide interpolymers are produced by known procedures. In a typical procedure, the reactive monomers are charged into a reaction vessel along with solvent, a mercaptan or other chain-modifying agent, and catalyst. The amount of catalyst added initially is generally 1 percent by weight of the reactive monomers; and this mixture is refluxed for 8 hours, with 0.5 percent portions of additional catalyst being added after the second, fourth, sixth and eighth hours. There are then added an aldehyde and an alcohol (usually butyl Formcel, which is a 40 percent solution of formaldehyde in n-butanol), along with maleic anhydride or a similar mild acid catalyst and additional solvent. This mixture is then refluxed for 3 hours while removing water azeotropically. The product is cooled and sufficient solvent added to produce a solution of the desired nonvolatile solids content. (In the examples and throughout the specification all parts and percentages are based upon weight and non-volatile solids content, unless otherwise indicated).

EXAMPLE A

An interpolymer is produced from the following reactive monomers:

| | Parts by weight |
|---|---|
| Acrylamide | 30.0 |
| Styrene | 262.5 |
| Methacrylic acid | 7.5 |

The above are polymerized using a total of 9 parts of cumene hydroperoxide catalyst and 3.75 parts of tertiary dodecyl mercaptan, and the polymer is further reacted with 63.6 parts of butyl Formcel in the presence of 0.8 part of maleic anhydride. The polymer solution produced has a solids content of 50 percent and a Gardner-Holdt viscosity of V to W, in a solvent mixture of 32.5 percent butanol, 22.5 percent xylene and 45.0 percent toluene.

EXAMPLE B

The monomers employed in making the interpolymer of this example are as follows:

| | Parts by weight |
|---|---|
| Acrylamide | 10.0 |
| Styrene | 87.5 |
| Methacrylic acid | 2.5 |

The polymer is produced using 3.5 parts of cumene hydroperoxide and 3 parts of tertiary dodecyl mercaptan, and is further reacted with 21.2 parts of butyl Formcel in the presence of 0.27 part of maleic anhydride. The product has a solids content of 49 percent and a Gardner-Holdt viscosity of Q+, in a solvent mixture of 32.5 percent butanol, 22.5 percent xylene and 45 percent high boiling aromatic naphtha (boiling range 187–205° C.).

EXAMPLE C

The following monomers are employed in this example:

| | Parts by weight |
|---|---|
| Acrylamide | 35.1 |
| Methacrylic acid | 8.8 |
| Styrene | 212.4 |
| Methyl methacrylate | 94.8 |

These are reacted in the presence of a total of 10.5 parts of cumene hydroperoxide and 10.5 parts of tertiary-dodecyl mercaptan. The polymer is modified by reaction with 74.4 parts of butyl Formcel and 0.93 part of maleic anhydride. The product has a Gardner-Holdt viscosity of T to U and a solids content of 51 percent, in a solvent containing 25 percent butanol, 25 percent xylene and 50 percent toluene.

EXAMPLE D

In this example, the following monomers are employed:

| | Parts by weight |
|---|---|
| Acrylamide | 27.0 |
| Methacrylic acid | 6.75 |
| Hydroxyethyl methacrylate | 13.5 |
| Methyl methacrylate | 65.0 |
| Styrene | 104.0 |
| 2-ethyl hexyl acrylate | 54.0 |

A total of 8.1 parts of cumene hydroperoxide and 4.1 parts of tertiary dodecyl mercaptan are utilized in carrying out the reaction, and the polymer produced is modified by reaction with 57.0 parts of butyl Formcel in the presence of 0.72 part of maleic anhydride. The solvents employed are 135 parts of butanol and 136 parts of xylene, giving a product having a solids content of about 50 percent and a Gardner-Holdt viscosity of W to Y.

EXAMPLE E

An interpolymer is prepared from a mixture of the following components:

| | Parts by weight |
|---|---|
| N-Butoxymethyl acrylamide | 198 |
| Styrene | 231 |
| Ethyl acrylate | 264 |
| Methacrylic acid | 15 |
| Butanol | 354 |
| Toluene | 354 |

The above mixture is refluxed for 2 hours in the presence of 7 parts of cumene hydroperoxide and 7 parts of tertiary-dodecyl-mercaptan, and then for three more successive 2-hour reflux periods, after each of which were added 3.5 parts of cumene hydroperoxide. During the last two reflux periods, the formed water was removed by azeotropic distillation. The resulting resinous product has a solids content of 50 percent and a Gardner-Holdt viscosity of T to U.

The above amide interpolymers and aromatic reaction products compositions are formulated into coating compositions having the desirable properties described herein, as illustrated by the following:

Example 1

In this example, a commercially available aromatic reaction product of the class described was employed, known as Methylon 75202. It is a reaction product of xylene-formaldehyde resin and a polyepoxide made from Bisphenol A and epichlorohydrin, produced in accordance with U.S. Patent 2,825,712 (see Example 3). The solution of the product in a solvent mixture of 2 parts xylol, 2 parts diacetone alcohol and 1 part butyl Cellosolve, has the following properties:

Solids content—65%
Viscosity (Gardner-Holdt)—Z1–Z2
Pounds per gallon—8.5–8.7

This aromatic reaction product was used to form a coating composition by mixing the following:

| | Parts by weight |
|---|---|
| Amide interpolymer composition of Example B (49 percent solids) | 600 |
| Aromatic reaction product | 59 |
| Epoxy resin[1] (65 percent solids) | 127 |
| Pigment paste F | 154 |
| Pigment paste G | 1.7 |
| Isophorone | 25 |
| Aromatic naphtha (B.P. 160–173° C.) | 150 |

[1] Toluene solution of reaction product of Bisphenol A and epichlorohydrin having epoxide equivalent of 450–523 and molecular weight of 900–1000 (Epon 1001).

The pigment pastes employed in the above coating composition had the following compositions:

| Pigment Paste F | Parts by weight |
|---|---|
| Amide interpolymer composition of Example B (49 percent solids) | 320 |
| Diacetone alcohol | 60 |
| High-boiling aromatic solvent (B.P. 465–550° F.) | 170 |
| Titanium dioxide | 1125 |

| Pigment Paste G | |
|---|---|
| Amide interpolymer composition of Example C (51 percent solids) | 460 |
| Xylene | 250 |
| Carbon black | 124 |

The coating composition was reduced to a viscosity of 20 seconds (#2 Zahn cup) with a 90/10 mixture of high boiling aromatic naphtha (B.P. 187–205° C.) and diacetone alcohol and applied to calcium-zinc phosphate treated steel panels to give a 0.3 mil thick dry film. For comparison, another such panel was coated with a coating composition made in the same manner except that the aromatic reaction product was omitted. Both panels were baked at 350° F. for 30 minutes and evaluated by a commercially used detergent resistance test involving exposure to a 1½ percent detergent solution in distilled water at 165° F. The panel containing the coating made in accordance with the present invention was unaffected after 100 hours, whereas the comparison panel (without the aromatic reaction product) failed the test, being badly blistered and peeled with loss of adhesion.

Example 2

A coating composition is produced as in Example 1 except that the only resinous components are as follows:

| | Percent by weight |
|---|---|
| Amide interpolymer composition of Example A (50 percent solids) | 85 |
| Aromatic reaction product (as in Example 1) | 15 |

Coatings of this composition, made as above and baked at 350° F. for 30 minutes, successfully pass the detergent resistance test described above for a period of 200 hours, whereas coatings made in the same way but without the methylol phenol ether composition fail in 100 hours or less.

Example 3

This example illustrates the use of the compositions described as a flash primer. Several panels were coated with the coating composition of Example 1 and air-dried for 20 minutes. They were then topcoated with enamels of the following composition (in parts by weight):

|  | Enamel #1 | Enamel #2 | Enamel #3 |
|---|---|---|---|
| Amide interpolymer composition of Example C (51 percent soilds) | 400 | 380 | 360 |
| Aromatic reaction product (as in Example 1) | | 15 | 31 |
| Isophorone | | 5 | 9 |
| High-boiling aromatic solvent (B.P. 465–550° F.) | 55 | 55 | 55 |
| Epoxy resin solution (as in Example 1) | 40 | 40 | 40 |
| Pigment paste H [1] | 416 | 416 | 416 |
| Diacetone alcohol | 32 | 32 | 32 |
| Butyl carbitol | 15 | 15 | 15 |
| Plasticizer [2] | 30 | 30 | 30 |
| Polyethylene (10 percent in xylene) | 30 | 30 | 30 |
| Silicone fluid (2 percent in xylene) | 2 | 2 | 2 |
| Curing agent [3] | 5 | 5 | 5 |

[1] Same as Pigment Paste F above except using Amide Interpolymer C in place of Amide Interpolymer B.
[2] Polyether of trimethylol propane and propylene oxide (Pluracol 2540).
[3] Maleic anhydride adduct of styrene-allyl alcohol copolymer as in U.S. 3,118,853.

Each of the topcoated panels was baked at 350° F. for 30 minutes and evaluated in the above detergent resistance test for 240 hours. The panel in Enamel #1 was somewhat blistered, that with Enamel #2 was only slightly blistered and that with Enamel #3 was substantially unaffected. All of the coatings showed greatly superior resistance as compared to coresrponding coatings made without any aromatic reaction product of the class described.

In these and other tests it has been shown that incorporation of the aromatic reaction products in coating compositions as described invariably greatly increases the detergent resistance of the resulting coatings, and provides in addition coatings of overall excellent quality for use as described. Good results are obtained not only with compositions as specifically exemplified but with other compositions employing, for instance, other amide interpolymers, and other aromatic reaction products, such as those made from methylol phenol ether compositions. One such aromatic reaction product is made by reacting 62.5 parts of an 80 percent solution in xylene in the xylene-formaldehyde resin used in Example 1 with 100 parts of a 50 percent solution in butanol of a mixture of the allyl ethers of mono-, di- and tri-methylol phenol (Methylon 75108). This reaction, carried out at 125° C. for one hour in the presence of 85 percent phosphoric acid, produces an aromatic reaction product which can be substituted for that used in the above examples to also give coating compositions of outstanding properties.

Also, while it is preferred to employ minor amounts (e.g. up to 30 percent of the resinous vehicle) of epoxy resins, such as those described and others as disclosed, for instance, in U.S. Patents 2,870,117 and 3,315,011, or amine-resins (i.e. amino-aldehyde resins such as benzoguanamine-formaldehyde, urea-formaldehyde and melamine-formaldehyde resins, some of which are described in U.S. Pat. 3,050,495), such additive materials can be omitted, or other added or coreacted materials can be included. Such other materials can be, for example, hydroxyl-containing polymers or their adducts, as in U.S. Pats. 3,118,852 and 3,118,853; organopolysiloxanes, for instance, those in U.S. Pat. 3,261,881; alkyds, as in U.S. Pat. 2,940,945; and others.

According to the provisions of the patent statutes, there are described above the invention and what are now considered to be its best embodiments. However, within the scope of the appended claims, it is to be understood that the invention can be practiced otherwise than as specifically described.

We claim:
1. A resinous coating composition comprising:
   (1) an interpolymer of from about 2 to about 50 percent by weight of an unsaturated carboxylic acid amide and at least one other polymerizable ethylenically unsaturated monomer, said interpolymer being characterized by containing amido groups having a hydrogen atom replaced by the structure:

where R is selected from the group consisting of hydrogen and lower alkyl radicals, and $R_1$ is selected from the group consisting of hydrogen and organic radicals, and (2) from about 1 to about 50 percent, based on the total weight of (1) and (2) herein, of an aromatic reaction product of an alkyl-substituted aromatic hydrocarbon-aldehyde condensate with a member of the group consisting of (a) polyepoxides having more than one 1,2-epoxy groups per molecule, and (b) methylol phenol ether compositions consisting essentially of one or more methylol phenol ethers of the formula

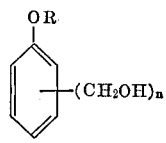

where $n$ is an integer from 1 to 3 and R is an unsaturated aliphatic group or a halogen-substituted unsaturated aliphatic group, the trimethylolated derivative being predominant in said methylol phenol ether compositions; said aromatic reaction product containing from about 30 to about 70 percent by weight of said alkyl-substituted aromatic hydrocarbon-aldehyde condensate.

2. The composition of claim 1 in which said interpolymer is characterized by containing amido groups having a hydrogen atom replaced by the structure:

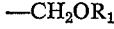

where $R_1$ is lower alkyl.

3. The composition of claim 2 in which said unsaturated carboxylic acid amide is acrylamide.

4. The composition of claim 2 in which said structure is a butoxymethyl group.

5. The composition of claim 2 in which at least about 50 percent of the amido groups have a hydrogen atom replaced by the structure:

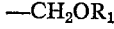

where $R_1$ is lower alkyl.

6. The composition of claim 1 in which said aromatic reaction product is formed from a polyglycidyl ether of a polyhydric compound.

7. The composition of claim 6 in which said polyglycidyl ether is an epichlorohydrin-Bisphenol A reaction product.

8. The composition of claim 1 in which said aromatic reaction product is formed from a methylol phenol ether composition.

9. The composition of claim 8 in which said methylol phenol ether composition consists essentially of a mixture of allyl ethers of mono-, di-, and trimethylol phenol.

10. The composition of claim 1 in which said aromatic reaction product is formed from a xylene-formaldehyde condensate,

11. The composition of claim 1 in which there is included as an added resinous component an epoxy resin, an amine resin or both.

12. A resinous coating composition comprising:
(1) an interpolymer of from about 2 to about 50 percent by weight of acrylamide or methacrylamide and one or more other polymerizable ethylenic monomers, said interpolymer being characterized by containing amido groups having a hydrogen atom replaced by the structure:

$$-CH_2OR_1$$

where $R_1$ is lower alkyl, and
(2) from about 3 percent to about 25 percent, based on the total of (1) and (2) herein, of an aromatic reaction product of a xylene-formaldehyde condensate and a polyglycidyl ether of a polyhydric compound, said aromatic reaction product containing from about 30 to about 70 percent by weight of said xylene-formaldehyde condensate.

13. The composition of claim 12 in which said polyglycidyl ether is a Bisphenol A-epichlorohydrin reaction product having an epoxide equivalent of from about 1650 and about 2050.

14. An article having a surface coated with an adherent cured layer of the coating composition of claim 1.

15. The article of claim 14 in which said surface is metal.

16. The article of claim 14 in which said coating composition is a primer and contains a superimposed layer of a different coating composition.

References Cited

UNITED STATES PATENTS

| | | | |
|---|---|---|---|
| 2,890,192 | 6/1959 | Spencer | 260—831 |
| 2,984,588 | 5/1961 | Grailich | 260—844 |
| 3,117,693 | 1/1964 | Vogel | 260—834 |
| 3,255,147 | 6/1966 | Krueger | 260—834 |
| 3,291,770 | 12/1966 | Gaylord | 260—831 |
| 3,291,856 | 12/1966 | Tringali | 260—831 |

SAMUEL H. BLECH, Primary Examiner

P. LIEBERMAN, Assistant Examiner

U.S. Cl. X.R.

117—132, 72, 75, 161; 260—834, 844, 72, 52, 830, 67